PATENTED AUG 15 1972

INVENTOR.
BRUCE K. JOHNSON
BY Brown and Mikulka
and
Robert L. Berger
ATTORNEYS

United States Patent
Johnson

[15] 3,683,764
[45] Aug. 15, 1972

[54] CAMERA SYSTEM FOR RECORDING PLURALITY OF IMAGES ON A PHOTOGRAPHIC SHEET

[72] Inventor: Bruce K. Johnson, Andover, Mass.

[73] Assignee: Polaroid Corporation, Cambridge, Mass.

[22] Filed: June 25, 1970

[21] Appl. No.: 49,960

Related U.S. Application Data

[63] Continuation-in-part of Ser. No. 864,671 filed Oct. 8, 1969, abandoned

[52] U.S. Cl..............................................95/1.1, 95/18
[51] Int. Cl..............................................G03b 17/24
[58] Field of Search.....................................95/1.1, 18

[56] References Cited

UNITED STATES PATENTS

| | | | |
|---|---|---|---|
| 2,807,198 | 9/1957 | Renik | 95/1.1 |
| 2,216,960 | 10/1940 | Pistor | 95/18 X |

*Primary Examiner*—John M. Horan
*Attorney*—Brown and Mikulka, William D. Roberson and Robert L. Berger

[57] ABSTRACT

A camera system for photographically recording selected portions of the images from each of a plurality of scenes on mutually exclusive areas of a sheet of photographic material, at least part of such images of the plurality of scenes being directed towards the photographic material in overlapping relationship. An objective lens is associated with each scene and forms an image thereof on the photographic material. Adjacent each objective lens is a polarizer having its transmission axis oriented in a direction different from the orientation of the transmission axes of the other of such polarizing elements. Overlying each such area of the photographic material is a sheet of polarizing material having its transmission axis aligned with that of the one aforementioned polarizing element adapted to first intercept the light rays from the scene to be recorded on that particular area of the photographic sheet.

15 Claims, 4 Drawing Figures

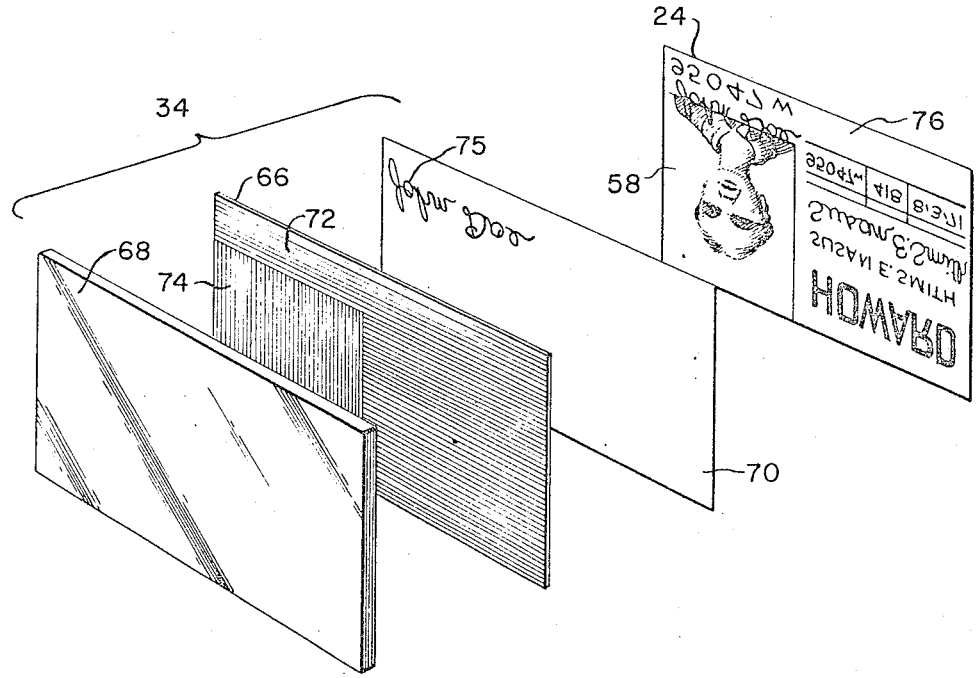

CAMERA SYSTEM FOR RECORDING PLURALITY OF IMAGES ON A PHOTOGRAPHIC SHEET

BACKGROUND OF THE INVENTION

This is a continuation-in-part of application Ser. No. 864,671, filed Oct. 8, 1969 entitled "Camera System for Recording Plurality of Images on a Photographic Sheet."

1. Field of the Invention

This invention relates to photo-imaging and, more particularly, to an improved system for forming selected portions of images of a plurality of scenes on respectively selected sections of a single focal plane.

2. Description of the Prior Art

Frequently it is necessary to present different types of information on a single format. One common requirement of this nature is an identification card which includes both a photograph of the subject and certain printed data concerning the subject and issuing agency. Until recent years, identification cards of this type had generally been produced by first taking a photograph of the subject and later cutting and pasting that photograph onto a card containing the pertinent information in printed form. This type of operation normally resulted in the subject's receiving his identification card a number of weeks after being photographed. Another disadvantage associated with these earlier identification card producing techniques was the continuous hazard that the issuing agency might put a photograph on the wrong card causing considerable confusion in the agency's records. Additionally, if the photograph proved unsatisfactory when returned in fully processed form, it was necessary to recall the subject in order to procure a satisfactory photograph.

Systems are now available which facilitate the simultaneous photographic reproduction of images of the subject and the desired information on a single sheet of photographic material. One such system is presently marketed by Polaroid Corporation of Cambridge, Massachusetts which produces the recorded images on a single photograph in full color in 60 seconds. In another 60 seconds, the card produced by this camera system can be laminated with an overlay of transparent plastic material and sealed in a protective transparent pouch. There is no need to recall the person at a later date for a retake because the card did not turn out perfectly. The subject leaves with a positive, permanent means of identification. A temporary card is not required, nor is there any delay waiting for the completed card to be delivered. Also, there is no expense in handling the card at a later date such as costs associated with obtaining records from files and card delivery or pick-up.

No special skills are required to operate identification card systems of this type, which can be run by anyone who has the manual dexterity to manage a simple office machine. Such a system can provide as many as 200 sealed full color identification cards in a period of one hour.

The aforementioned system of Polaroid Corporation includes a validation plate which overlies the sheet of photographic material during the exposure operations. This plate is generally transparent, being provided with indicia such as a signature, company name, trademark or other symbol, that is photographically reproduced on the identification card. The indicia is preferably located on the validation plate so as to be superimposed in part on both the photograph of the subject and the data portion of the card. This indicia makes it virtually impossible to tamper with or replace the photograph without detection.

These systems are presently enjoying extensive use in a number of states for purposes of producing driver's licenses. Additionally, they are being employed by various government agencies, colleges and private companies to provide tamper-proof means of identification. Obviously, the use of such systems will increase as a function of reductions in their cost.

In systems of this type, a septum arrangement is normally provided to prevent overlapping of the two images, i.e., to preclude light rays from the data card intersecting that section of the photographic sheet reserved for the image of the subject and for precluding light rays from the subject from intersecting that section of the photographic sheet reserved for the information printed on the data card. This septum arrangement represents a significant element in the cost of producing these systems, the major portion of which cost element is the amount of time required for a skilled technician to mount and precisely adjust the various septums within the camera. The present invention is directed to an improved identification card camera arrangement which eliminates the requirement for septums and results in a significant cost savings in producing such systems.

One of the objects of this invention, therefore, is to provide an improved system for forming selected portions of the images of a plurality of scenes on mutually exclusive areas of a focal plane.

Another primary object of this invention is to provide an improved system for forming images of a plurality of scenes on mutually exclusive areas of a single sheet of photographic material while limiting the light rays intersecting each such area of the sheet of photographic material to light rays from one of such scenes.

A further object of this invention is to provide a camera system of the type in which images of a plurality of scenes are formed on a sheet of photographic material and which includes a relatively inexpensive arrangement for restricting the light rays intersecting a selected portion of such sheet of photographic material to those from one of such scenes.

An additional object of this invention is to provide an improved camera of the type which forms images of a plurality of scenes on a single sheet of photographic material and in which filters are employed to permit only the light rays from one such scene to intersect one selected section of such photographic material.

Also, an object of this invention is to provide an improved camera system for forming images of a plurality of scenes on a single sheet of photographic material and which employs polarizing elements for purposes of restricting the light rays intersecting selected sections of a sheet of photographic material to those light rays from respective such scenes.

SUMMARY OF THE INVENTION

In its illustrated preferred embodiment, the camera system of this invention is adapted to photographically produce an identification card having a first section on which a photograph of the subject is presented and a second section on which certain information concerning the subject and the issuing agency is presented. The camera has a film holder adapted to mount a sheet of unexposed photographic material at a focal plane. This camera is also adapted to receive within its housing structure a data card on which is imprinted the aforementioned information concerning the subject and the issuing agency.

Mounted within the camera in operative relationship to the data card is an electronic flash unit and various other conventional optical elements for forming an image of the data card on the sheet of photographic material. The camera is also provided with conventional optical elements for forming an image of the subject seated externally of the camera system onto the sheet of photographic material.

A light filtering arrangement is employed in the camera's optical system. In this respect, preferably polarizing elements having orthogonally aligned transmission axes are positioned within the camera's optical system so that substantially all of the light rays from the subject are polarized by one such element while substantially all of the light rays from the data card are polarized by the other of such elements. Overlying the sheet of photographic material is a light polarizing plate. This plate is formed of a polarizing material disposed adjacent the section of the photographic material on which the image of the subject is intended to be recorded and which has its transmission axis aligned in the same direction as that of the aforementioned polarizing element associated with the light rays from the subject. The other portion of this polarizing plate overlies the section of the photographic material on which the information imprinted on the data card is to be recorded and has its transmission axis aligned in the same direction as that of the aforementioned polarizing element associated with the light rays from the data card. Thus, this arrangement precludes light rays from the subject intersecting that section of the sheet of photographic material on which the data card information is intended to be recorded and light rays from the data card intersecting that section of the sheet of photographic material upon which the subject's photograph is intended to be recorded.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

DESCRIPTION OF A PREFERRED EMBODIMENT

Figure 1:
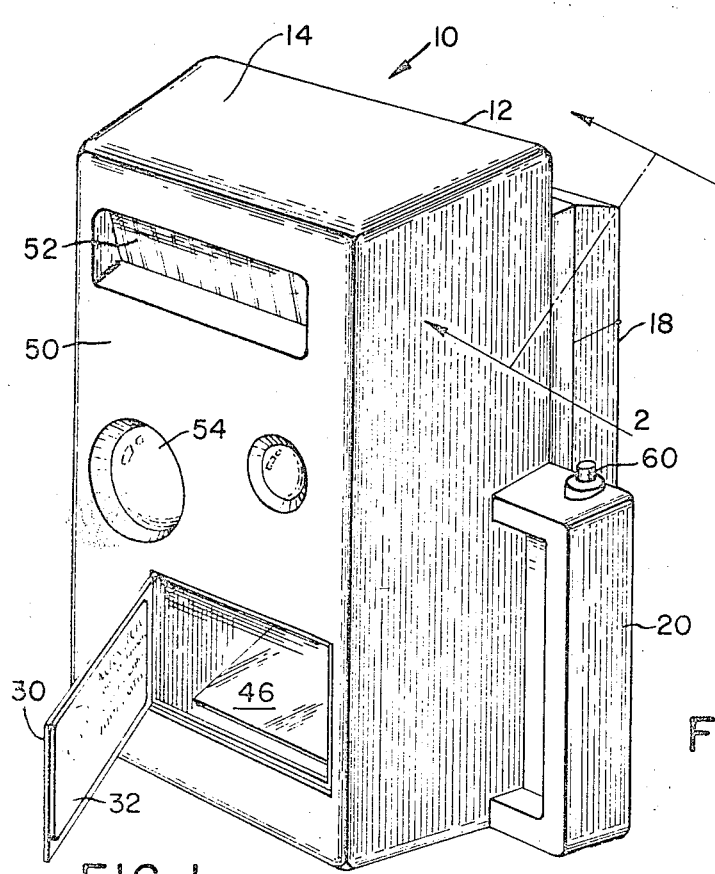
FIG. 1 is a diagrammatic perspective view of a camera system incorporating the features of the present invention.

The illustrated preferred embodiment of this invention may best be understood by first referring to FIG. 1 of the drawings which illustrates a camera system 10 capable of photographically producing identification cards depicting a photograph of the subject and certain information concerning the subject and the issuing agency.

This camera system 10 comprises an opaque housing 12 including a first section 14 in which the camera's optical system is contained and a film holder 18 removably connected thereto. Extending from one side of the camera's first section 14 is a handle 20 designed to be gripped by the operator for purposes of aiming and/or supporting the camera during exposure operations. Preferably, the film holder 18 is adapted to receive a film pack 22 containing a plurality of film units (See FIG. 3), which may advantageously be of the diffusion-transfer processing type, and to sequentially position the negative emulsion bearing photographic sheet 24 of each film unit at a focal plane 26 within the camera 10. Also housed within the film holder 18 are means (not shown) for effecting the application of a processing fluid between the negative emulsion bearing photographic sheet 24 and an image-receiving sheet of each film unit after exposure and as the film unit is withdrawn from the holder by the operator's pulling a tab 28 connected thereto. The specific forms of the film holder 18 and the film units contained in the film pack 22 do not constitute part of the present invention and, for instance, may be identical to those of such items currently being marketed.

The first section 14 of the camera system 10 is provided with a hinged door 30 on which a data card 32 may be removably mounted by any suitable means. When the hinged door 30 is closed with a data card 32 mounted thereon, the card is automatically positioned at the proper location within the camera system for subsequent exposure operations.

Figure 2:
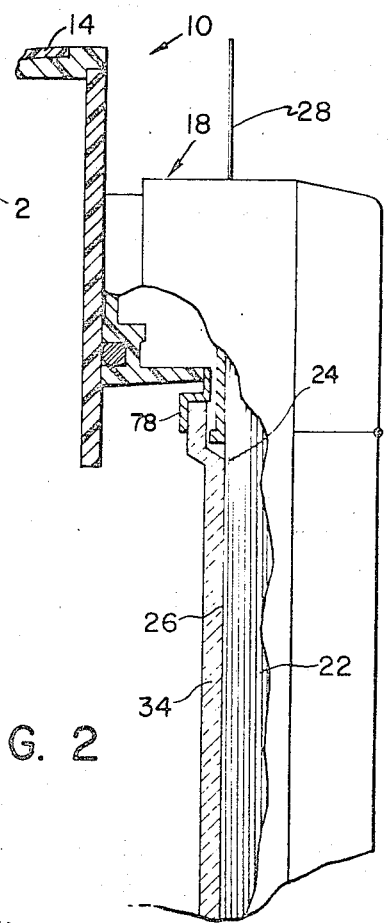
FIG. 2 is a diagrammatic perspective view of the optical system employed in the camera system of FIG. 1.
Figure 3:
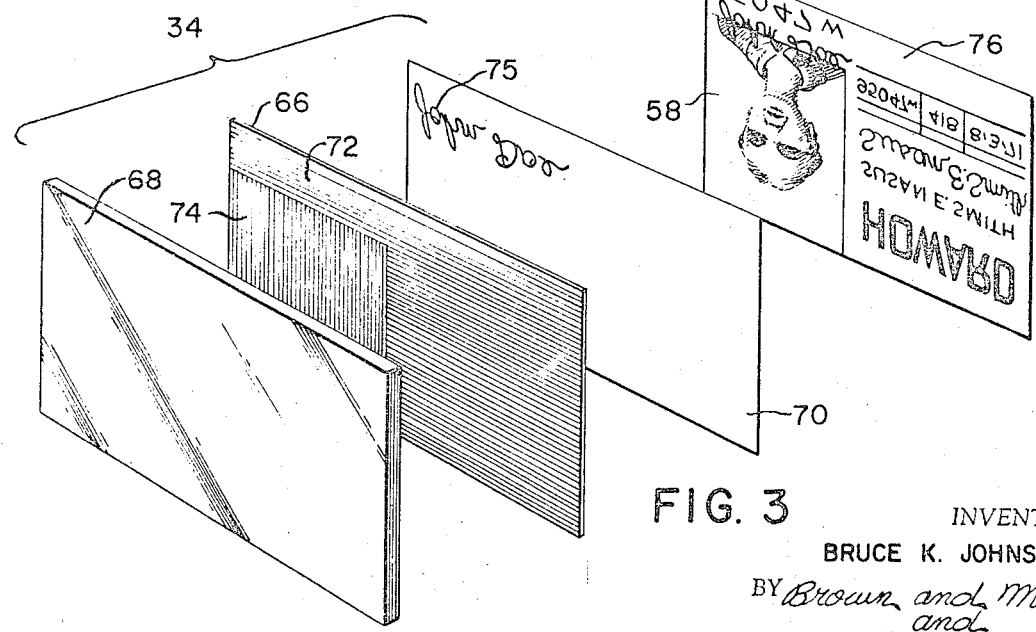
FIG. 3 is a fragmentary sectional view of the camera system of FIG. 1 taken along line 3—3 of FIG. 1.

FIG. 2 diagrammatically illustrates the optical system housed within the section 14 of the camera 10 and the operable relationship between that optical system and a polarizing plate 34 which, in the illustrated preferred embodiment, is mounted within the film holder 18 so as to overlie the sheet of photographic material 24 positioned at the camera's focal plane (See FIG. 3). The nature of this polarizing plate 34 and the important function which it performs within the camera system 10 will be discussed in detail hereinafter.

In this figure of the drawings, the data card 32 is shown as being positioned within the camera system 10 at the proper location for photographing. It will be noted that in this embodiment the information appearing on the data card 32 and intended to be photographically reproduced on the photographic sheet 24 is located on a generally "L-shaped" section 35 of the card. An objective lens-shutter element 36 associated with the data card 32 is mounted in an opaque internal wall member 38 of the camera system 10 which wall member effectively serves to divide that system into two separate light-tight chambers 40 and 42. Positioned within the camera system's chamber 42 is an electronic flash unit 44 which, when fired, serves to illuminate the data card 32. Conventional means (not shown) are provided to fire the flash unit 44 whenever the shutter of the element 36 is activated. Light rays from the illuminated data card 32 are reflected by a first mirror 46 through the lens-shutter element 36 onto a second mirror 48 and then redirected by that mirror onto the polarizing plate 34 overlying the photographic sheet 24. The objective lens of the element 36 serves to form an image of the data card 32 on the sheet of photographic material 24.

Located in the front face 50 (See FIG. 1) of the camera system 10 is a second electronic flash unit 52 and a second objective lens-shutter element 54 which facilitates the photographing of a subject positioned in front of the camera. In this connection, the flash unit 52 illuminates the subject and an image of that subject is formed by the objective lens 54 on the sheet of photographic material 24. In the illustrated preferred embodiment, the mirror 48 is provided with a cut-out (or unsilvered portion) 56 so as not to preclude certain light rays from the subject intersecting a selected section 58 (See FIG. 4) of the sheet of photographic material 24 on which it is intended to produce an image of the subject. Conventional means may be employed to fire the flash unit 52 upon opening of the shutter 54.

Conveniently mounted on the handle 20 is a button 60 (See FIG. 1) which may be selectively depressed by the operator to effect simultaneous exposure of the subject and data card 32. In this connection, a conventional arrangement may be employed to activate the shutters 36 and 54 whenever the button 60 is so depressed.

As in the case of the film holder 18, the film units contained therein and the arrangements for activating the shutters 36 and 54 and flash units 44 and 52, the lens-shutter elements 36 and 54 and the electronic flash units do not by themselves constitute a part of the present invention. Consequently, these components of the system may take conventional or special forms other than as illustrated in the drawings within the scope of the present invention. Additionally, other arrangements of these elements within a camera system other than that illustrated and described in connection with the preferred embodiment of the present invention may be employed within the scope of this invention.

As shown in FIG. 2, a polarizing element 62 is mounted adjacent the lens-shutter element 36 so that all of the light rays passing through that lens-shutter element from the data card 32 are polarized by that element 62. Similarly, a second polarizing element 64 is mounted adjacent the lens-shutter element 54 so that all of the light rays passing through that lens-shutter element from the subject are polarized by that element 64. It is most important to note that the transmission axes of the polarizing elements 62 and 64 are orthogonally aligned will respect to each other.

Figure 4:
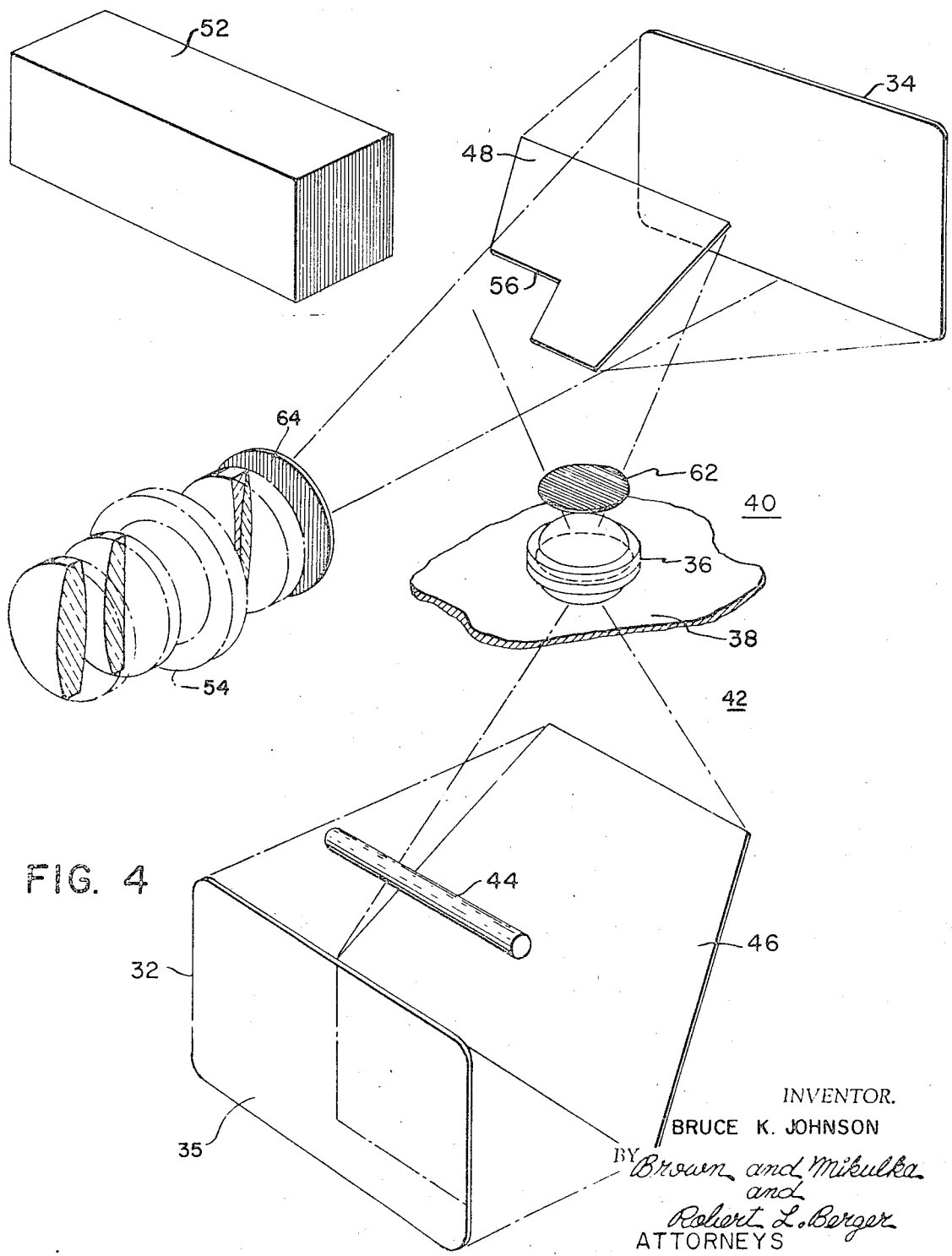
FIG. 4 is a diagrammatic exploded view of the validation plate forming part of the camera system of FIG. 1 and illustrating the operable relationship between that plate and a sheet of photographic material mounted in such system.

Referring now to FIG. 4 of the drawings, it will be seen that the polarizing plate 34 is constituted by a sheet of polarizing materials 66 mounted between a pair of light transparent supports 68 and 70. As indicated, the polarizing plate 34 overlies and is positioned in close proximity to the sheet of photographic material 24. Consequently, the sheet of polarizing materials 66 may have approximately the same dimensions as the finished identification card. This sheet 66 comprises a first generally "L-shaped" section 72 having a transmission axis aligned with that of the polarizing element 62 and a rectangular shaped section 74 having its transmission axis aligned with that of the polarizing element 64. Conventional means may be employed to fabricate the sheet of polarizing materials 66. For instance, this sheet 66 may comprise a lamination of polyvinyl alcohol sheets, each having been stretched and molecularly oriented so as to be birefringent, appropriately dyed and printed in accordance with current techniques to provide the aforementioned sections 72 and 74 having orthogonally aligned transmission axes. Alternately, other conventional forms of polarizing sheet material may be cut, aligned and mounted on a suitable transparent support.

The supports 68 and 70 may be formed of any suitable material such as an acrylic lucite or a glass and appropriately adhered to the opposite faces of the sheet 66. These supports 68 and 70 not only serve to support the sheet of polarizing materials 66 but also serve to protect that sheet from foreign matter, abrasion, etc. The support 69 may also be provided with indicia 75, such as a validating signature, company name, trademark or other symbol, which it is intended to photographically reproduce on the sheet material 24. In this respect, such indicia may be hot stamped in an opaque ink into a surface of the support 70. Preferably, it would be stamped into the surface of that support 70 intended to be mounted adjacent the sheet of photographic material 24 and at a position thereon wherein it would appear in part on the section 58 of that material and a section 76 thereof on which latter section the data card information is reproduced.

For example, where the supports 68 and 70 are formed of acrylic lucite material and the sheet 66 comprises a lamination of polyvinyl sheets as hereinbefore described, the overall thickness of the polarizing plate may be on the order of 0.125 inches. More specifically, the support 68 may be 0.090 inches in thickness, the sheet of polarizing materials 66 may be 0.012 inches in thickness and the support 70 may be 0.023 inches in thickness. To minimize any distortion of the images, it is desirable that the support 70 be relatively thin and that the polarizing plate 34 be mounted as close as possible to the sheet of photographic material 24. The plate 34 is mounted adjacent the photographic sheet 24 so that the sections 72 and 74 of its polarized sheet 66 respectively overlie the sections 76 and 58 of the photographic sheet 24.

In the illustrated preferred embodiment the film holder 18 is provided with mounting clips 78 to releasably position the polarizing plate 34 adjacent the focal plane 26 before the film holder itself is mounted on the section 14 of the camera system 10.

OPERATION OF THE PREFERRED EMBODIMENT

To briefly summarize the operation of the preferred embodiment of this invention, the film pack 22 and polarizing plate 34 are appropriately mounted in the film holder 18 and then that holder is connected to the camera's first section 14. When the subject arrives to obtain his identification card, the operator or an assistant ascertains the necessary information and types that information onto an appropriate data card 32. This data card 32 is then mounted on the door 30 and the door closed to automatically position the data card within the camera system 10 for photographing purposes.

The subject is seated in front of the camera system 10 and, gripping the handle 20, the operator aims the camera system 10 at the subject and depresses the button 60. The button 60 simultaneously triggers the shutters of the elements 36 and 54, which shutters in turn fire the flash units 44 and 52.

Light rays from the data card are polarized by the element 62 and an image of the data card is formed on the sheet of photographic material 24 by the lens of the element 36. Similarly, light rays from the subject are polarized by the element 64 and an image of the subject is formed by the element 54 on the sheet of photographic material 24. Since the transmission axes of the polarizing element 62 and the section 72 of the sheet 66 are orthogonally aligned with respect to the polarizing element 64 and the section 74 of the sheet 66, light rays intersecting the section 58 of the sheet of photographic material 24 are limited to those from the subject, while the light rays intersecting section 76 of the sheet of photographic material are limited to those from the data card 32. An image of the indicia 75 on the light transparent support 69 is recorded on the sheet of photographic material 24 so as to appear in part on section 58 thereof and in part on section 76 thereof.

Naturally, it is desirable that light rays from the data card 32, which are polarized by the element 62, be directed effectively and efficiently onto the appropriate section 76 of the photographic sheet 24. As indicated, at the same time, it is desirable that section 74 of the sheet 66 preclude any such rays from impinging upon section 58 of the photographic sheet 24. Consequently, the polarization characteristic of such light rays should not be distorted or changed to any extent intermediate the element 62 and the sheet 66. In this respect, the alignment of the mirror 56 and the polarizing element 62 is preferably such that the transmission axis of that element, as depicted by the lines reflected thereon in the drawings, is parallel to the plane of the mirror. Any deviation from this type of alignment could result in a component of the light rays being oriented parallel to the transmission axis of section 74 of the sheet 66, whereby such component would pass through that section of the sheet 66 onto section 58 of the photographic sheet 24.

Those familiar with the photographic arts will readily appreciate the novel and highly unique advantages of this invention. Most importantly, effective and relatively inexpensive means are provided for forming images of a plurality of scenes on mutually exclusive areas of a single sheet of photographic material without image overlap. This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

What is claimed is:

1. Apparatus for forming images of first and second scenes on respective mutually exclusive areas of a single focal plane while precluding any overlap of such images, comprising:

first lens means for receiving light rays from such first scene and forming an image of such first scene at such focal plane;

second lens means for receiving light rays from such second scene and forming an image of such second scene at such focal plane;

first and second filter elements associated with such light rays from such first scene, said first filter element positioned to intercept substantially all such light rays from such first scene passing through said first lens means and said second filter element positioned adjacent and overlying one such area of such focal plane intermediate such one area and said first lens means, said first and second filter elements having the same filter factor; and third and fourth filter elements associated with such light rays from such second scene, said third filter element positioned to intercept substantially all such light rays from such second scene passing through said second lens means and said fourth filter element positioned adjacent and overlying the other such area of such focal plane intermediate such other area and said second lens means, said third and fourth filter elements having the same filter factor which differs from said filter factor of said first and second lens means, whereby said second filter element transmits at least a portion of such light rays passing through said first filter element, said fourth filter element transmits at least a portion of such light rays passing through said third filter element and said second and fourth filter elements respectively preclude the transmission therethrough of such light rays from such second and first scenes.

2. The apparatus of claim 1 wherein said first, second, third and fourth filter elements are polarizers with the transmission axes of said first and second polarizers being substantially orthogonally aligned with respect to the transmission axes of said third and fourth polarizers.

3. The apparatus of claim 1 wherein said second filter element and said fourth filter element are mounted together in substantially side by side relationship.

4. The apparatus of claim 3 additionally comprising a light transparent plate on which said second and fourth filter elements are mounted.

5. The apparatus of claim 4 wherein said light transparent plate comprises indicia adapted to be photographically reproduced on a sheet of photographic material positioned at such focal plane when at least a portion of such light rays are transmitted through said plate.

6. The apparatus of claim 4 wherein a protective portion of said plate extends from said second and fourth filter elements in the direction of such focal plane.

7. The apparatus of claim 6 wherein another protective portion of said plate extends from said second and fourth filter elements on the opposite side of said second and fourth filter elements from said first mentioned portion thereof.

8. The apparatus of claim 6 wherein said portion of said plate comprises indicia adapted to be photographically reproduced on a sheet of photographic material positioned at such focal plane when at least a portion of such light rays are transmitted through said plate.

9. A camera system for photographically recording the images of two separate scenes on first and second adjacent sections of a single sheet of photographic material while precluding any overlap of such images on such sheet of photographic material, comprising:

first means for mounting such sheet of photographic material;

second means for mounting a first subject within said camera system, at least a portion of an image of which such first subject is to be recorded on such first section of such sheet of photographic material;

third means for selectively illuminating such first subject and for forming an image thereof on such sheet of photographic material;

fourth means for selectively forming an image of a second subject located exteriorly of said camera system on such sheet of photographic material; and filter means for substantially precluding light rays from such first subject from impinging upon such second section of such sheet of photographic material and such light rays from such second subject from impinging upon such first section of such sheet of photographic material, said filter means comprising a first pair of polarizing elements associated with such first section of such sheet of photographic material having their transmission axes disposed in the same direction and a second pair of polarizing elements associated with such second section of such sheet of photographic material having their transmission axes disposed in the same direction but substantially orthogonally aligned with respect to said transmission axes of said first pair of polarizing elements.

10. The camera system of claim 9 wherein said first pair of polarizing elements comprises a first element positioned to intercept substantially all of such light rays passing through said third means and a second element positioned adjacent and overlying such first section of such sheet of photographic material and said second pair of polarizing elements comprises a third element positioned to intercept substantially all of such light rays passing through said fourth means and a fourth element positioned adjacent and overlying such second section of such sheet of photographic material.

11. The camera system of claim 10 additionally comprising a light transparent plate overlying such first and second sections of such sheet of photographic material and which mounts said second and fourth polarizing elements.

12. The camera system of claim 11 wherein said plate includes indicia adapted to be photographically reproduced on such sheet of photographic material when at least a portion of such light rays pass therethrough.

13. Photo-imaging apparatus for forming images from each of two scenes on mutually exclusive areas of a single focal plane while precluding any overlap of such images, comprising:

first means for receiving light rays from one such scene and forming an image thereof generally on one such area of such focal plane, said first means comprising a lens system and at least one substantially planar light reflecting means intermediate such one scene and such focal plane;

second means for receiving light rays from the other such scene and forming an image thereof generally on the other such area of such focal plane; and third means for restricting the light rays intersecting each such area of such focal plane to those from a respective such scene including a first polarizing element adapted to polarize substantially all of such light rays passing through said lens from such one scene disposed intermediate such one scene and said light reflecting means and a second polarizing element overlying such one area of such focal plane having its transmission axis disposed in the same direction as that of said first polarizing element, the transmission axes of both said polarizing elements being disposed in parallel alignment with the plane of said light reflecting means.

14. Apparatus for forming images of first and second subjects on respective mutually exclusive areas of a single focal plane while precluding any overlap of such images, comprising:

first lens means for receiving light rays from such first subject and forming an image of such first subject at such focal plane;

second lens means for receiving light rays from such second subject and forming an image of such second subject at such focal plane;

first and second filter elements associated with such light rays from such first subject, said first filter element positioned to intercept substantially all such light rays from such first subject passing through said first lens means and said second filter element positioned adjacent and overlying one such area of such focal plane intermediate such one area and said first lens means, said first and second filter elements having the same light filtering characteristic; and third and fourth filter elements associated with such light rays from such second subject, said third filter element positioned to intercept substantially all such light rays from such second subject passing through said second lens means and said fourth filter element positioned adjacent and overlying the other such area of such focal plane intermediate such other area and said second lens means, said third and fourth filter elements having the same light filtering characteristic which differs from the light filtering characteristic of said first and second filter elements, whereby said second filter element transmits at least a portion of such light rays passing through said first filter element, said fourth filter element transmits at least a portion of such light rays passing through said third filter element and said second and fourth filter elements respectively preclude the transmission therethrough of such light rays from such second and first subjects.

15. The invention of claim 14 wherein such first subject is located exteriorly of said apparatus in operative relationship with said first lens means and said apparatus additionally includes means for mounting such second subject therewithin in operative relationship with said second lens means.

* * * * *